(12) United States Patent
Kartoz

(10) Patent No.: US 7,024,547 B2
(45) Date of Patent: Apr. 4, 2006

(54) METHOD AND SYSTEM FOR INITIALIZING A HARDWARE DEVICE

(75) Inventor: Michael F. Kartoz, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 340 days.

(21) Appl. No.: 10/014,060

(22) Filed: Dec. 10, 2001

(65) Prior Publication Data

US 2003/0110368 A1     Jun. 12, 2003

(51) Int. Cl.
*G06F 15/177* (2006.01)

(52) U.S. Cl. .............................. 713/1; 713/2; 713/100; 714/35

(58) Field of Classification Search ................ 713/1, 713/2, 100; 714/35
See application file for complete search history.

(56) References Cited

U.S. PATENT DOCUMENTS 5,497,490 A  *  3/1996  Harada et al. ............. 713/100
5,768,568 A  *  6/1998  Inui et al. ..................... 710/16
6,209,089 B1 *  3/2001  Selitrennikoff et al. ........ 713/2
6,748,524 B1 *  6/2004  Stepp et al. ................... 713/1

OTHER PUBLICATIONS

"Direct Rambus SPD Specification 1.2", Rambus, Inc., Mountain View, CA Copyright 2000. DL-0068-120, SL-0005-120.
"PC SDRAM Serial Presence Detect (SPD) Specification", Revision 1.2A, Dec. 1997, Intel Corporation, Santa Clara CA.

* cited by examiner

*Primary Examiner*—A. Elamin
(74) *Attorney, Agent, or Firm*—Blakely, Sokoloff, Taylor & Zafman LLP

(57) ABSTRACT

A method and system for initializing at least one hardware device of a computer system are provided. The method includes storing reference data of the hardware device, the reference data including data required for operation of the hardware device within the system. Thereafter, current data is retrieved from the hardware device and compared to the reference data to determine if the hardware device has changed subsequent to storage of the reference data. If the hardware device has not changed, the reference data is used to initialize the hardware device.

32 Claims, 10 Drawing Sheets

| Byte Number | Fuction | Required/Optional |
|---|---|---|
| 0 | Defines # of bytes written into serial memory at module manufacturer | Required |
| 1 | Total # of bytes of SPD memory device | Required |
| 2 | Fundamental memory type (FPM, EDO, SDRAM..) *from Appendix A* | Required |
| 3 | # of row addresses on this assembly *(includes Mixed-size Row addr)* | Required |
| 4 | # Column Addresses on this assembly *(includes Mixed-size Col addr)* | Required |
| 5 | # Module Rows on this assembly | Required |
| 6 | Data Width of this assembly | Required |
| 7 | ...Data Width continuation | Required |
| 8 | Voltage interface standard of this assembly | Required |
| 9 | SDRAM Cycle time, CL=X (highest CAS latency) | Required |
| 10 | SDRAM Access from Clock (highest CAS latency) | Required |
| 11 | DIMM Configuration type (non-parity, ECC) | Required |
| 12 | Refresh Rate/Type | Required |
| 13 | *Primary SDRAM Width* | Required |
| 14 | *Error Checking SDRAM width* | Required |
| 15 | Minimum Clock Delay Back to Back Random Column Address | Required* |
| 16 | Burst Lengths Supported | Required* |
| 17 | # of Banks on Each SDRM Device | Required* |
| 18 | CAS# Latencies Supported | Required* |
| 19 | CS# Latency | Required* |
| 20 | Write Latency | Required* |
| 21 | *SDRAM Module Attributes* | Required* |
| 22 | *SDRAM Device Attributes: General* | Required* |
| 23 | *Min SDRAM Cycle time at CL X-1 (2nd highest CAS latency)* | Required* |
| 24 | *SDRAM Access from Clock at CL X-1 (2nd highest CAS latency)* | Required* |
| 25 | *Min SDRAM Cycle time at CL X-2 (3rd highest CAS latency)* | Optional* |
| 26 | *Max SDRAM Access from Clock at CL X-2 (3nd highest CAS latency)* | Optional* |
| 27 | *Min Row Precharge Time (Trp)* | Required* |
| 28 | *Min Row Active to Row Active (Trrd)* | Required* |
| 29 | *Min RAS to CAS Delay (Trcd)* | Required* |
| 30 | *Minimum RAS Pulse Width (Tras)* | Required* |
| 31 | *Density of each row on module (mixed, non-mixed sizes)* | Required |
| 32-61 | Superset Information (may be used in future) | |
| 62 | SPD Data Revision Code | Required |

Fig. 9A

| | | |
|---|---|---|
| 63 | Checksum for bytes 0-62 | Required |
| 64-71 | Manufacture's JEDEC ID code per JEP-108E | Optional |
| 72 | Manufacturing Location | Optional |
| 73-90 | Manufacture's Part Number | Optional |
| 91-92 | Revision Code | Optional |
| 93-94 | Manufacturing Date | Optional |
| 95-98 | Assembly Serial Number | Optional |
| 99-125 | Manufacture Specific Data | Optional |
| 126 | Intel specification frequency | Required |
| 127 | Intel Specification CAS# Latency support | Required |
| 128+ | Unused storage locations | |

Notes: Required/Optional *(bold)* are <u>SDRAM only</u> bytes

Fig. 9B

METHOD AND SYSTEM FOR INITIALIZING A HARDWARE DEVICE

FIELD OF THE INVENTION

The present invention relates generally to the field of computer systems and, more specifically, to a method and system for initializing at least one hardware device of a computer system.

BACKGROUND OF THE INVENTION

When a computer system is started or booted, various initialization procedures or routines are carried out. The boot procedure is performed, among other things, to check the hardware configuration of the system and to prepare the hardware devices found for normal use. The actions required to prepare for normal use are, in many cases, dependent upon other hardware configuration parameters. In other words, the presence of one hardware device may influence how another hardware device is configured. The time taken to complete the boot procedure thus depends upon factors such as the amount and type of memory the system includes, add-in card buses (such as peripheral component interconnect (PCI) buses, extended industry standard architecture (EISA) buses, micro channel architecture (MCA) buses, and/or accelerated graphics port (AGP) buses), storage devices, keyboards, pointing devices, or the like. A particular example of a procedure performed during booting is memory initialization, which is performed by the BIOS or firmware. Computer systems typically include several memory devices that are interfaced to a processor via a memory controller of a chipset. During the booting process, the firmware initializes certain registers in the memory devices and in the memory controller. These initialization procedures are performed each time the computer system is switched on or is re-booted and may result in a delay of several seconds to several minutes before a user may use the computer system.

BRIEF DESCRIPTION OF THE DRAWINGS

In the drawings,

FIGS. 9A and 9B show an example of Serial Presence Detect data that may define reference data used in the methods of FIGS. 4 to 7.

DETAILED DESCRIPTION

Figure 1:
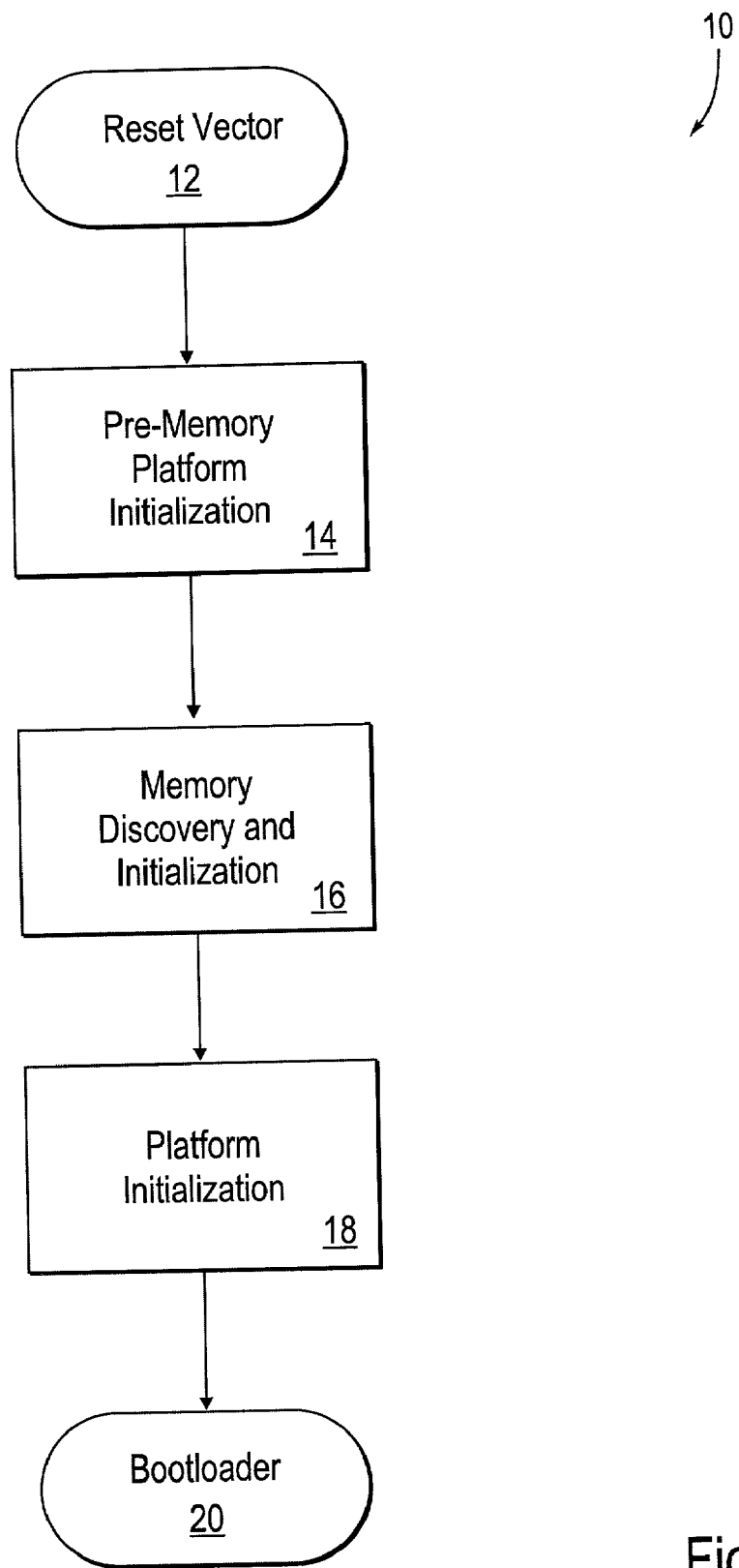
FIG. 1 shows a schematic flow diagram of a prior art memory initialization method.

Referring to the drawings, reference numeral 10 generally indicates a prior art memory initialization method. The method 10 is typically carried out when a computer system, typically a personal computer (PC) or the like, is booted. Accordingly, the method 10 is usually performed when a BIOS (basic input/output system) or firmware of the computer performs memory initialization in which certain registers in memory devices and in a memory controller of the chipset of the computer system are initialized.

In order to initialize a memory device, the firmware typically accesses each memory device to obtain certain information about the memory device. The information retrieved is dependent on the memory device type and its associated memory controller and generally includes size data, architecture data, speed data, or the like, of the device. In certain circumstances, the memory devices may be accessed multiple times in order to obtain the abovementioned information and, in computing terms, it is a relatively slow operation taking sometimes on the order of 2.5 milliseconds per bit.

As shown in FIG. 1 (prior art), the firmware obtains a reset vector 12 whereafter a pre-memory platform initialization step 14 is carried out. Thereafter, as shown at step 16, the firmware performs various memory discovery and initialization procedures followed by final platform initialization procedures as shown at step 18. Finally, a bootloader step 20 is executed.

The manner in which the memory discovery and initialization step 16 takes place is dependent upon the particular memory device that is included in the computer system. In particular, memory devices are usually grouped together as one or more individual memory devices which are provided in a common memory module. Usually, a particular computer system includes similar memory modules. However, in certain circumstances, the memory modules may vary. The memory devices have certain characteristics that differentiate one memory device from another, such as memory type (RDRAM, SDRAM, DDR-SDRAM or the like), the size of the memory device (amount of memory present in the device), the organization of data in the memory device (this typically represents a logical grouping within the memory device, e.g. rows, columns, word size or the like), the speed of the memory device (how quickly the memory device can be accessed and is usually specified in MHz), error checking capabilities of the memory device (error-correcting code (ECC), checksum or the like).

Insofar as the speed of the memory device is concerned, each memory access cycle during memory discovery and initialization may consist of many smaller sub-operations and, therefore, the speed of the memory device is dependent upon many timing parameters that govern time delays between various operations on the particular memory device. In view of the aforementioned, and in order to ensure proper operation of a computer system, memory initialization procedures are carried out each time the computer system is started or booted.

Further, as memory devices used in computer systems are usually replaceable (e.g., memory devices may be added or removed), the possibility exists that when the computer system is booted, the memory configuration could have changed and, accordingly, the characteristics of the memory devices mentioned above may thus also have changed. As a memory device change influences system operation, the memory discovery portion of the firmware determines what the memory characteristics are each time the computer system is booted. The firmware is stored in non-volatile storage such as ROM, EPROM, EEPROM, battery backed-up memory, registers in an application specific integrated circuit (ASIC), or the like, so that the instructions stored therein for booting are not lost upon powering down the computer system.

Thus, as described above, prior art booting methods perform memory discovery and initialization procedures each time the computer system is switched on or booted. These procedures are executed even if the hardware devices, such as the memory devices, of the computer system have not changed and this results in delays ranging from a few seconds to even minutes when the computer system is booted.

Figure 2:
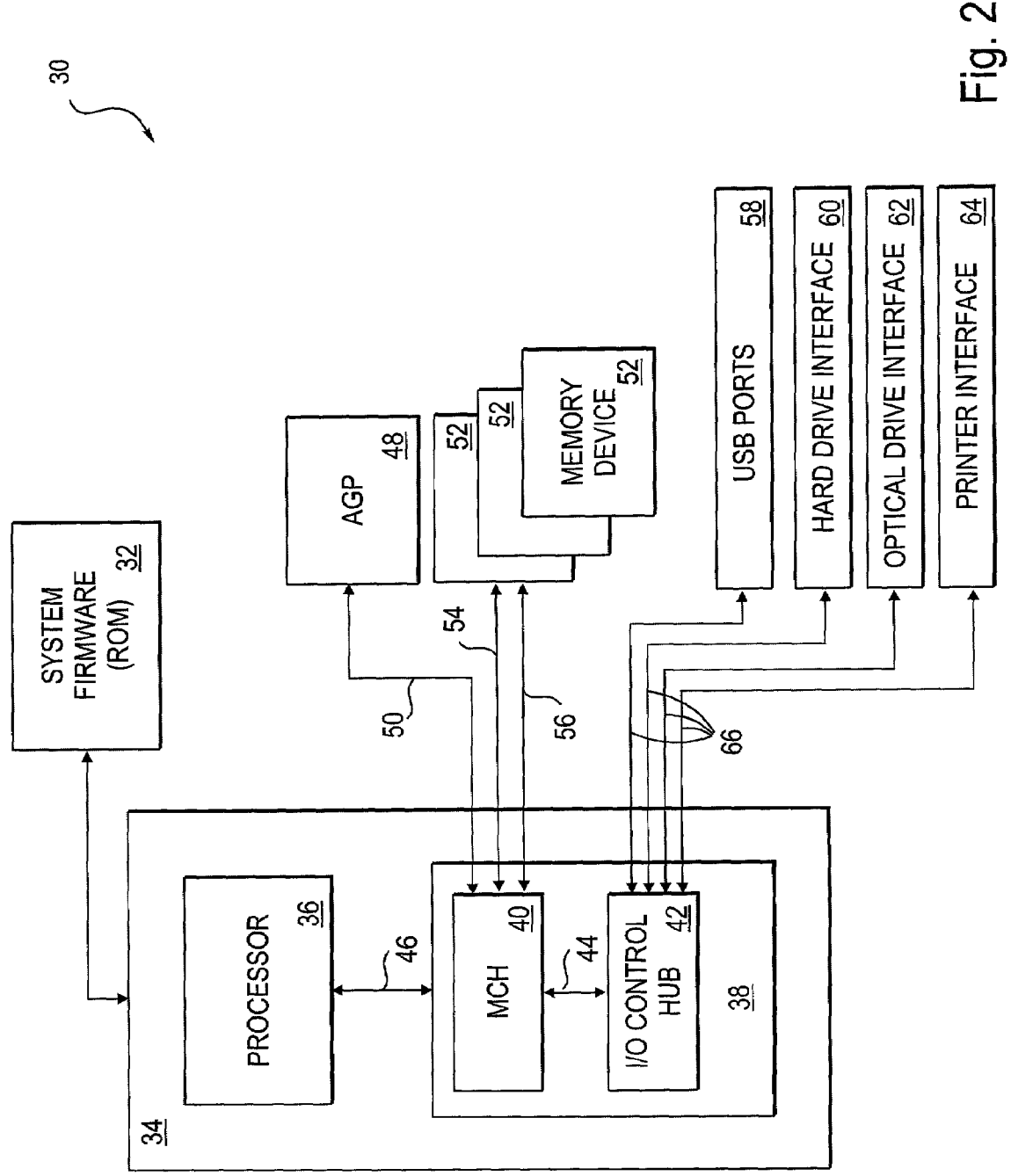
FIG. 2 shows a schematic block diagram of a computer system, according to the invention, wherein certain components or parts of the system have been omitted for the sake of clarity.
Figure 3:
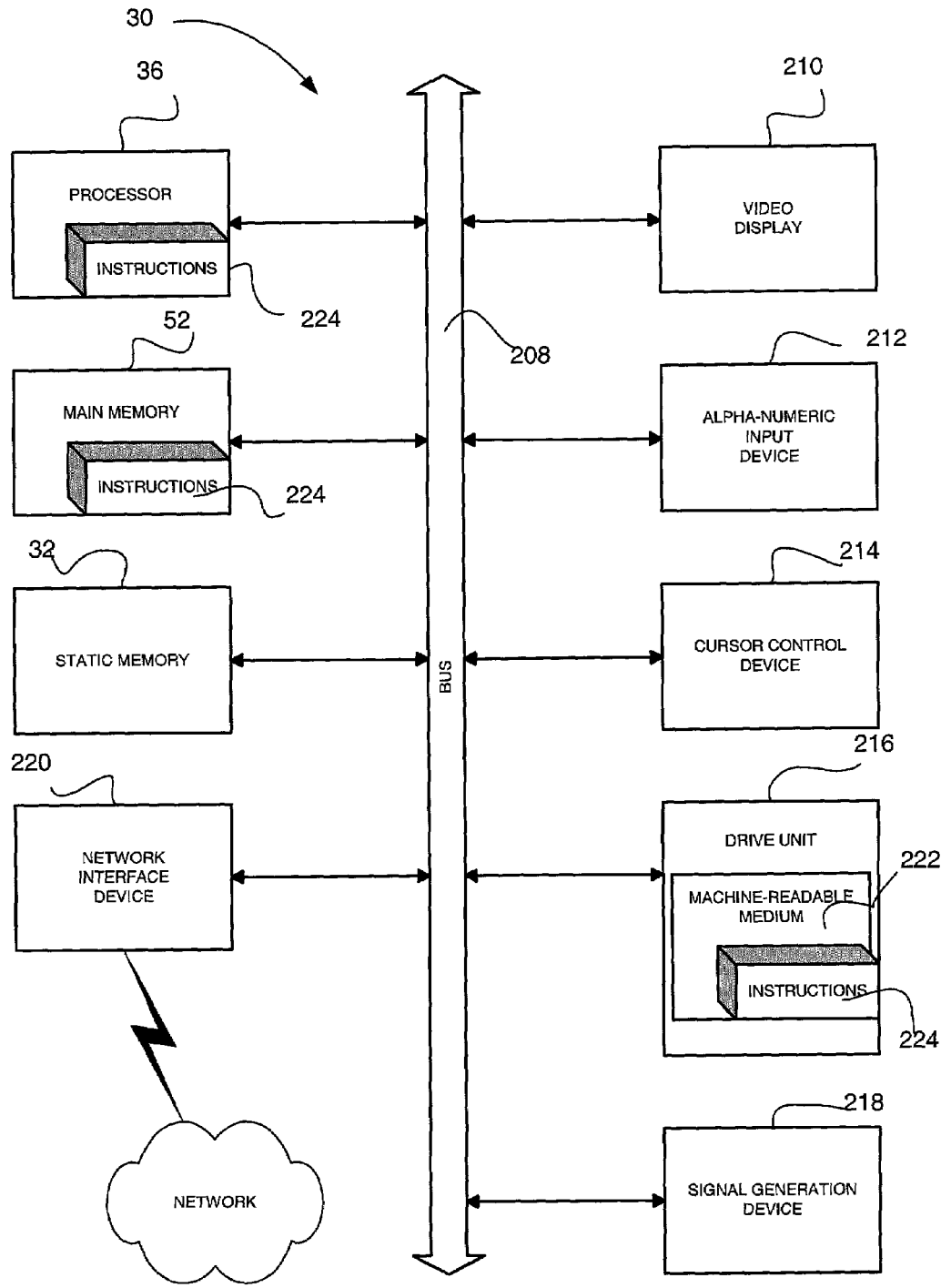
FIG. 3 shows a more detailed schematic block diagram of the system of FIG. 2.
Figure 4:
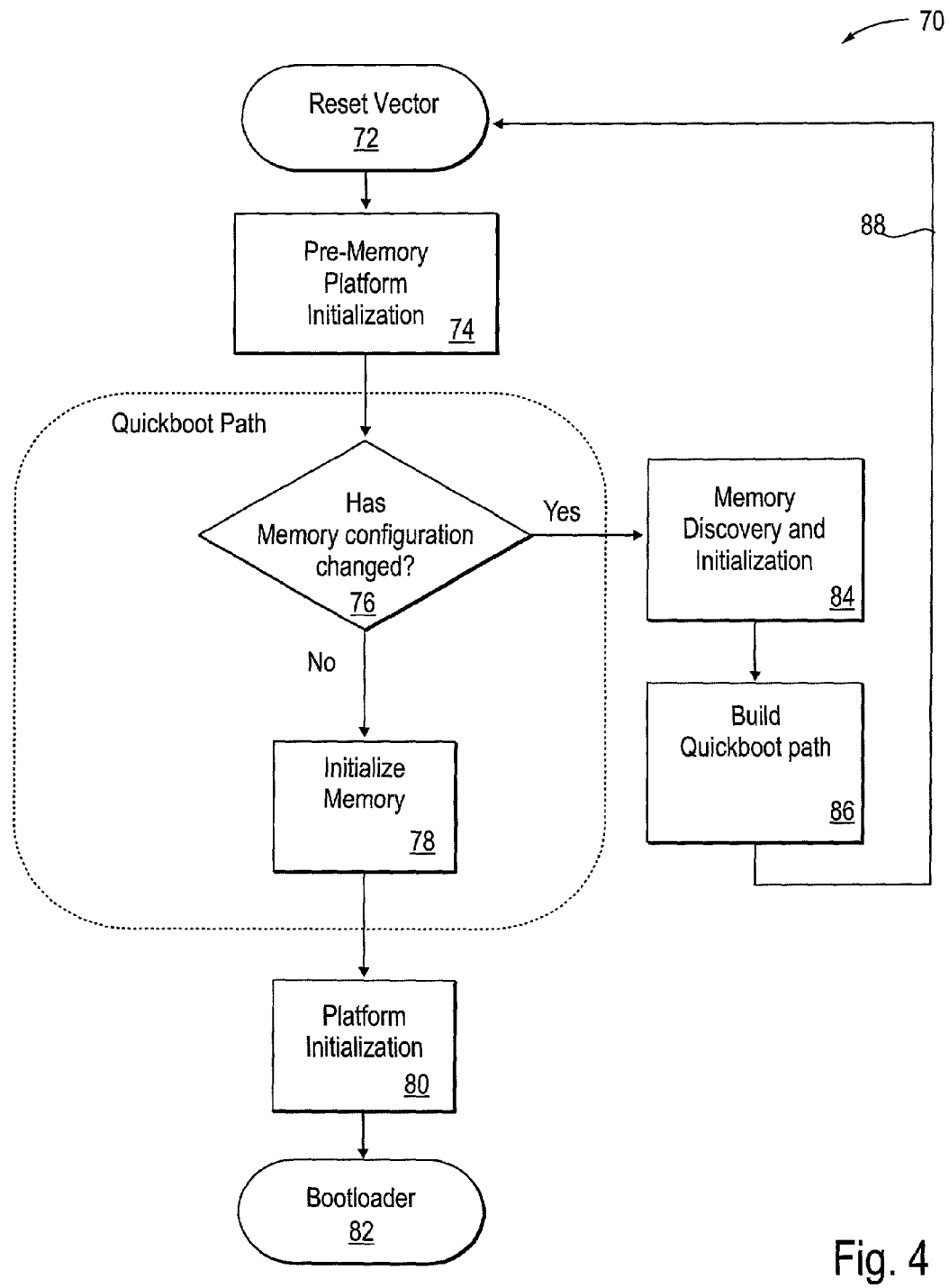
FIG. 4 shows a schematic flow diagram of a method, also according to the invention, of initialization a hardware component of the computer system of FIG. 2.

Referring in particular to FIG. 2 of the drawings, reference numeral 30 generally indicates a computer system in accordance to the invention, which has, embedded in its system firmware 32, instructions for initializing various hardware components of the system 30 using a unique method, also in accordance with the invention. The system 30 includes a motherboard 34 on which a processor 36 and chipset 38 are provided. The chipset 38 includes a memory controller hub (MCH) 40 and an I/O controller hub (ICH) 42 which communicate with each other via a chipset specific interconnect 44. The chipset 38 and processor 36 communicate with each other via a frontside bus (FSB) 46. The system 30 also includes various other hardware components such as an accelerated graphics port (AGP) 48 coupled to the MCH 40 via a bus 50, a plurality of memory devices or modules 52 connected via a memory interface 54 and a configuration bus 56 to the MCH 40. Examples of further electronic devices of the system 30 include a USB port 58, a hard drive interface 60, an optical drive interface 62, and a printer interface 64 which are connected to the ICH 42 via lines 66. It is however important to appreciate that for the sake of clarity, various standard components or devices used in the computer system 30 have been omitted from FIG. 2 of the drawings and, some of these additional components, are described in more detail below with reference to FIG. 3. It is important to appreciate that the MCH 40 and the ICH 42 are merely examples of chip components used in order to illustrate the invention. In addition to, or instead of, the MCH 40 and the ICH 42, other chipset components having the same or different functionality may be used and this invention is not limited to use where the chipset components have similar function to an MCH or an ICH.

referring in particular to FIG. 4 of the drawings, reference numeral 70 generally indicates a method, in accordance with the invention, of initializing at least one hardware component in the form of the memory devices 52 of the computer system 30. When the system 30 is booted, a reset vector 72 is retrieved from the system firmware 32. The reset vector 72 provides a predefined address at which the processor 36 begins executing instructions at power on or reset. The particular predefined address may naturally differ from platform to platform based on the type of processor that is used in the system 30. Thus, irrespective of the particular computer platform, the method 70 retrieves the predefined address that is mapped to firmware to allow firmware instructions to gain control of the processor 36 upon power on or reset.

Once the processor 36 has been directed to the predefined address by the reset vector 72, pre-memory platform initialization is performed at step 74 as described in more detail below. Thereafter, unlike the prior art method 10, the method 70 then checks to ascertain or determine whether or not the configuration of the memory devices 52 has changed as shown at step 76. If no change has occurred, and as described in more detail below, the method 70 then initializes the memory devices 52 as shown at step 78 using reference data acquired during a previous boot procedure. Once the memory devices 52 have been initialized, further platform initialization procedures are carried out as shown at step 80 whereafter a bootloader step 82 is executed. Thus, and as described in more detail below, the method 70 does not automatically perform comprehensive memory discovery and initialization procedures each time the computer system 30 is booted, but only performs these procedures if the memory configuration has changed as shown at step 76.

If the configuration of the memory devices 52 has changed, then the reference data may no longer be valid and, accordingly, new reference data for the memory devices 52 must be obtained. Accordingly, as shown at step 84, a memory discovery and initialization procedure is executed when the configuration has changed to obtain current reference data uniquely associated with the memory devices 52. Once the current reference data has been obtained, step 86 of the method 70 extracts reference initialization data and reference identification data uniquely associated with the memory device 52 to define updated reference data. The reference initialization data is typically obtained after the discovery procedure is executed and defines that data uniquely associated with the memory device 52 which the system 30 and memory device 52 require for proper operation. For example, the reference initialization data may be serial presence detect (SPD) data of the memory device 52 or procedural data that can be interpreted or executed to cause the initialization of the memory device 52. As mentioned above, in addition to the reference initialization data, the reference data also includes reference identification data that is used to uniquely identify the particular memory devices 52 and, accordingly, determine whether or not the reference initialization data corresponds to the particular memory devices 52. The reference identification data may, for example, be a manufacture's part number or serial number.

An example of reference data uniquely associated with the memory devices 52 is shown in FIGS. 9A and 9B. In particular, FIGS. 9A and 9B show a table of SPD data formats for an exemplary SDRAM. Typically, byte numbers 0–24, 27–63, and 126 and 127 are required when the memory initialization procedure is carried out. These byte numbers are read by the system 30 to perform memory initialization and define the reference initialization data. Data in one or more of the byte numbers 64 to 125 may define the reference identification data that the method 70 uses to ascertain whether or not the memory device 52 has a changed.

In particular, the method 70 during a quick bootpath step 86 obtains the current SPD data and stores it as reference initialization data and reference identification data and, when the method 70 checks at step 76 to determine whether or not the memory configuration has changed, it typically retrieves only current identification data from each of the memory devices 52 and compares the retrieved data with the reference identification data to determine whether or not the configuration of each memory device 52 has changed. If the retrieved identification data and the reference identification data for all memory devices 52 match, then the method 70 uses the reference initialization data to initialize the memory devices 52. Thus, in the method 70, a comprehensive memory discovery and initialization procedure as shown at step 84, is only carried out if the method 70 senses that there has been a change in the memory module identification data.

Once the reference initialization data and the reference identification data has been obtained, it is stored in non-volatile memory whereafter the method 70 reverts to the reset vector step 72 as shown by line 88. Thus, the current data is stored to define reference data. Thereafter, the pre-memory platform initialization step 74 is executed and the method 70 checks to determine whether or not the memory configuration has changed at step 76. As the reference identification data and the current identification data now match, the method 70 will now proceed, as described above, to initialize the memory devices 52 as shown at step 78.

Figure 5:
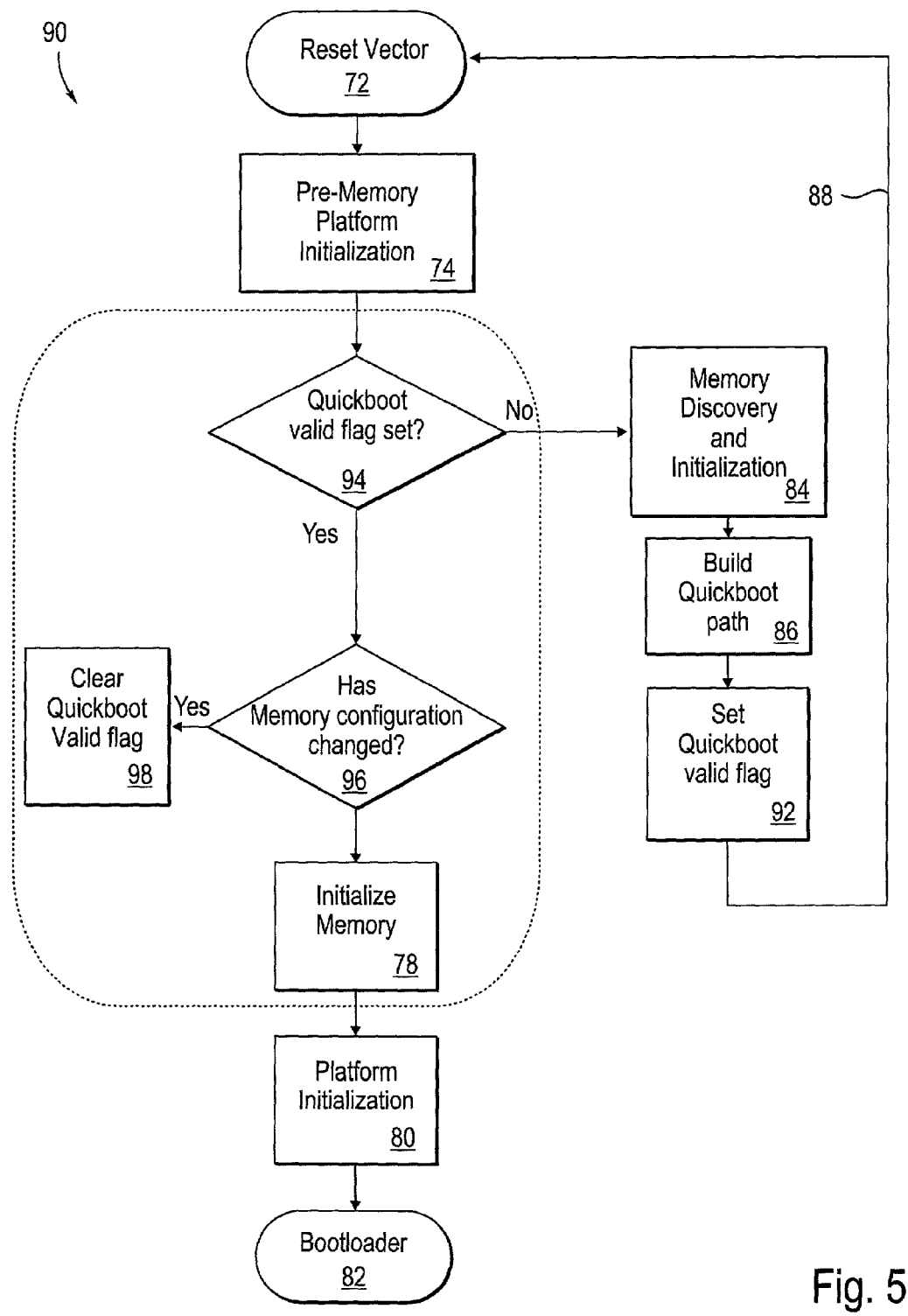
FIG. 5 shows a schematic flow diagram of a further embodiment of a method of initialization a hardware component of the computer system of FIG. 2.

Referring in particular to FIG. 5 of the drawings, reference numeral 90 generally indicates a further embodiment of a memory initialization method, in accordance to the invention, for initializing the memory devices 52. The method 90 substantially resembles the method 70 and, accordingly, like reference numerals have been used to indicate the same or similar features unless otherwise indicated. Unlike the method 70, the method 90 incorporates a quickboot valid flag that can be used to force a rebuild of the quickboot path. The method 90 sets a quickboot valid flag, as shown at step 92, after a build quickboot path has been established at step 86. The flag is used to indicate whether or not the memory devices 52 have changed and, accordingly, as shown at step 94, the method 90 checks to see whether or not the quickboot valid flag is set. If the flag has not been set, the method 90 branches to step 84 and a comprehensive memory discovery and initialization procedure is then performed and the build quickboot path steps are executed (see step 86) whereafter the quickboot valid flag is set as shown at step 92. If, however, the quickboot valid flag is set, then the method 90 branches from step 94 to step 96 to check whether or not the configuration of the memory devices 52 has changed and, if not, the method 90 initializes the memory devices 52 as shown at step 78. Thus, the quickboot valid flag can be used to force a rebuild of the quickboot path and/or to prevent the use of the reference identification data and/or reference initialization data if it does not exist. If, however, the configuration of the memory devices 52 has changed then the method 90 branches from step 96 to step 98 where the quickboot valid flag is cleared and the procedure returns to the reset vector step 72. Thus, the method 90 sets a flag to indicate a change of status in the memory devices 52.

In the embodiments of the invention described above, the methods 70, 90 check or compare current data, which is retrieved from the memory devices 52 during a boot procedure, with reference identification data stored in non-volatile memory during a previous boot procedure. As mentioned above with reference to FIG. 9, the identification data is typically data such as a manufacturer's part number, a revision code, a manufacturing date, an assembly serial number, manufacture specific data, or the like. However, in other embodiments of the invention, comparing the current identification data to the reference identification data may include running or executing memory initialization algorithms on configuration data such as the reference initialization data as discussed below with reference to FIG. 6.

Figure 6:
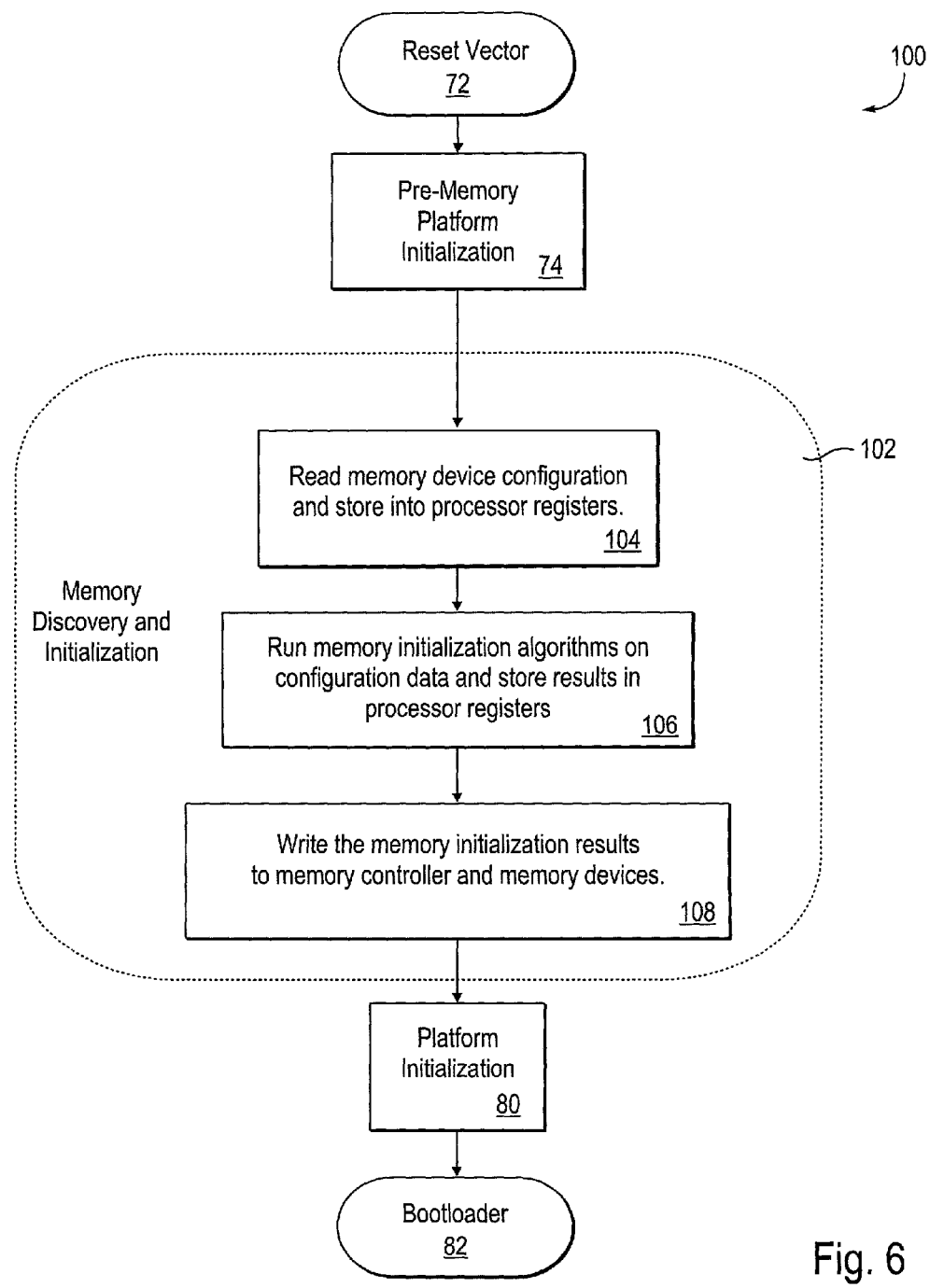
FIG. 6 shows a schematic flow diagram of a memory discovery and initialization method according to a further embodiment of the present invention.

In FIG. 6, reference numeral 100 generally indicates a further embodiment of a memory initialization method in accordance with the invention.

In a similar fashion to that described above, the method 100 retrieves a reset vector at step 72 whereafter pre-memory platform initialization (e.g., initialization of the chipset 38) is carried out as shown at step 74. However, prior to the platform initialization step 80 and the bootloader procedure 82, the method 100 performs memory discovery and initialization steps 102. In particular, the method 100 reads the configuration data (e.g. SPD data) of the memory devices 52 and stores the configuration data as reference data (including reference identification data and reference initialization data) in registers of the processor 36 as shown at step 104. Thereafter, the memory initialization algorithms are run using the configuration data and the results are stored in registers of the processor 36 as shown at step 106. The method 100 then writes the memory initialization results to the MCH 40 and to the memory devices 52 as shown at step 108. The purpose of the memory initialization algorithms is to identify the particular memory devices 52 and thus any suitable algorithm may be used. The algorithm thus uses the configuration data to check if a memory device 52 has been changed.

Figure 7:
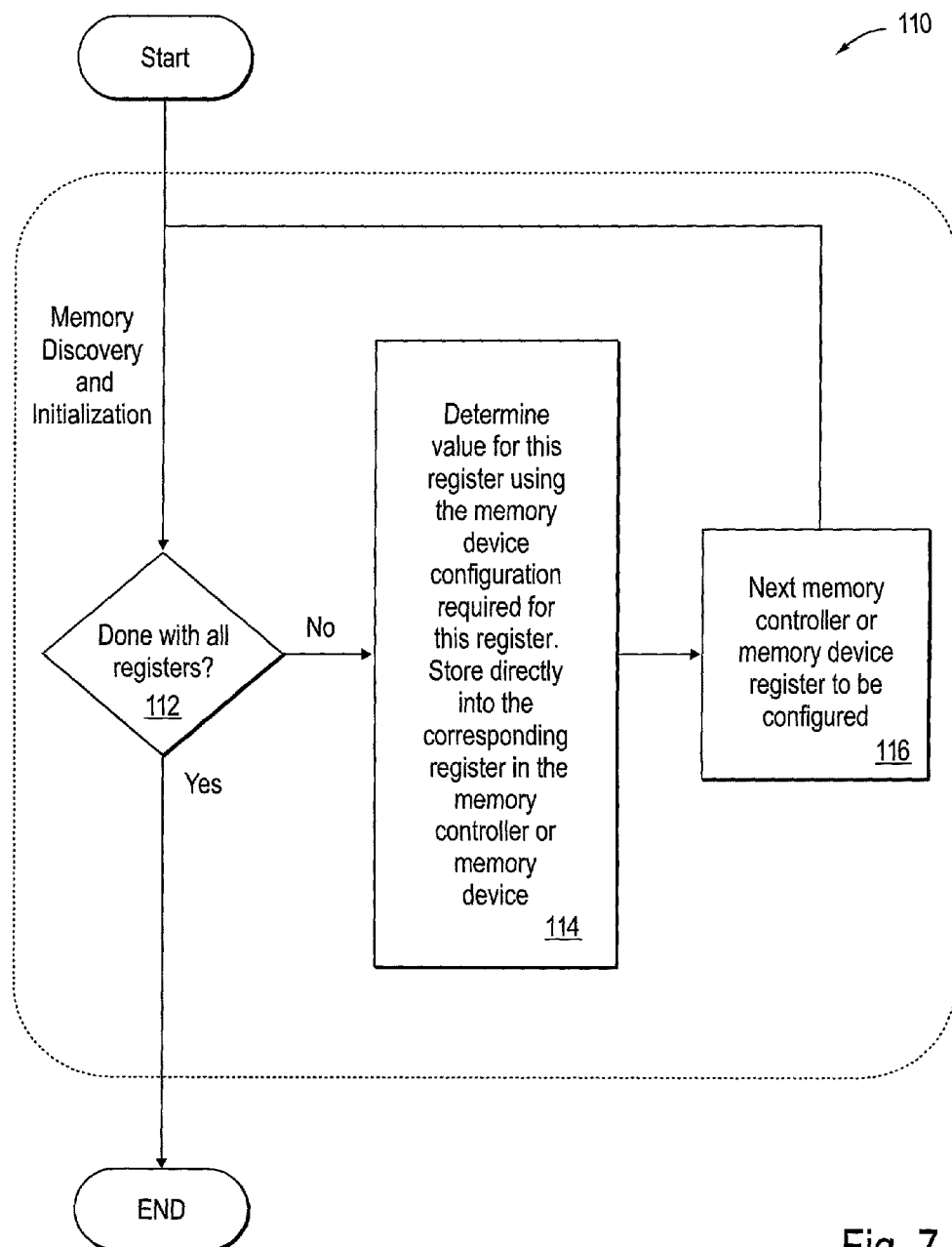
FIG. 7 shows a schematic flow diagram of an exemplary memory discovery and initialization procedure used in the methods of FIGS. 4 to 5.

Referring in particular to FIG. 7 of the drawings, reference numeral 110 generally indicates an exemplary procedure used in the method for initializing the memory devices 52. In the example, due to operational requirements of the MCH 40, some initialization of the MCH 40 also takes place. The procedure 110 initializes each memory register of the memory devices 52 sequentially by executing steps 112, 114, and 116 until all the registers have been initialized. In step 112, the procedure 110 checks if all registers have been initialized and, if not, the procedure determines the initialization data in the form of a value required for the particular register as shown in step 114. In the step 114, information is also stored directly into the corresponding register in the MCH 40 or the memory devices 52 depending upon their operational requirements. Thereafter, as shown at step 116, the next register of the MCH 40 or next memory device 52 to be configured is accessed and the process reverts to step 112. If, however, all the registers have been initialized, then the procedure 110 proceeds to the platform initialization step 80.

As mentioned above, FIG. 3 shows a more detailed diagrammatic representation of the computer system 30 which is an example of a machine within which a set of instructions, for causing the machine to perform any one of the methods discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 30 includes a processor 36, a main memory 52 and a static memory 32, which communicate with each other via a bus 208. The computer system 30 may further include a video display unit 210 (e.g., a liquid crystal display (LCD) or a cathode ray tube (CRT)), an alpha-numeric input device 212 (e.g. a keyboard), a cursor control device 214 (e.g. a mouse), a disk drive unit 216, a signal generation device 218 (e.g. a speaker) and a network interface device 220.

The disk drive unit 216 includes a machine-readable medium 222 on which is stored a set of instructions (software) 224 for operation of the system 30. The software 224 is also shown to reside, completely or at least partially, within the main memory 52 and/or within the processor 36. The software 224 may further be transmitted or received via the network interface device 220. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and carrier wave signals.

Figure 8:
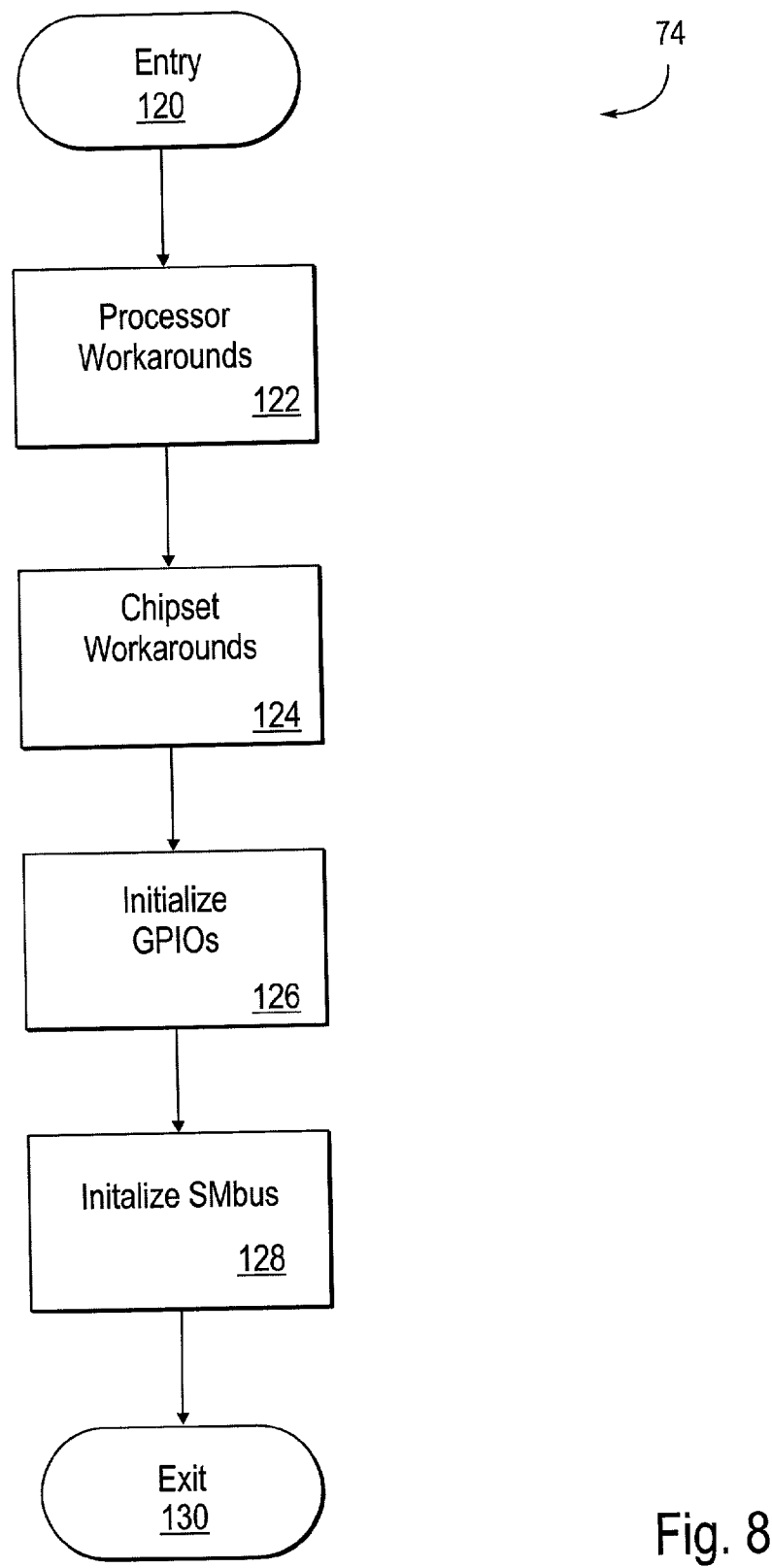
FIG. 8 shows a schematic flow diagram of an exemplary pre-memory platform initialization procedure.

The pre-memory platform initialization step 74 is typically highly platform dependent and may thus vary from computer system to computer system. Examples of platform dependent aspects include the type of motherboard 34 used in the computer system 30, the type of processor 36, the various embedded devices of the motherboard 34, the nature and type of chipset 38, how the individual chips in the computer system 30 are addressed and mapped, or the like. An example of various sub-steps carried out by the pre-memory initialization step 74 is shown in FIG. 8. Upon entry into this step, as shown at 120, processor patches are typically stored and processor workarounds are configured as shown at step 122. Typically, this step is required as some processors may have errors that must be corrected in firmware in order to achieve its specified functionality. Thereafter, patches that may be required for the chipset 38 are installed and/or workarounds of the chipset 38 may be configured as shown at step 124. As in the case of the processor 36, the chipset 38 may have errata that must be corrected in firmware in order for the chipset 38 to function according to specification. Thereafter, platform hardware such as general purpose input/output devices (GPIOs) that will be used during memory initialization is enabled as shown at step 126.

The particular hardware that must be initialized, in order to perform the memory initialization, may be dependent upon the storage of configuration information of the memory devices 52 (or any other hardware component to be initialized using the methods described above) and the type of hardware that must be enabled so that the memory devices 52 have the appropriate clock signals, or the like. Typically, these aspects are a matter of choice during the design processes of the computer system 30. In the step 126, the procedure initializes the GPIOs to match the hardware design of the computer system 30. Finally as shown in step 128, an SMbus is initialized. Thereafter, the procedure exits from step 74 and proceeds to the memory discovery and initialization procedures.

As mentioned above, the procedure which checks whether or not any one of the memory devices 52 has changed may vary in different embodiments. In less sophisticated embodiments, the comparison between the identification data and the reference identification data may merely be a direct comparison of values. However, in more sophisticated embodiments of the invention, comparing of the data may involve algorithms as described above. Examples of the nature of the data used to define the identification data of each memory device 52 are as follows:

A memory module serial number (from a non-volatile storage component present on the memory device 52) may be used. Typically, this is a number that is unique to each memory device and the number may be retrieved to define the reference identification data stored during a comprehensive boot operation.

Memory device configuration information (from a non-volatile memory storage component present on the memory device) may be used to define the identification data. In certain circumstances, the memory device configuration information may be provided in a compressed format.

Case intrusion data sourced from a sensor that is operable to sense when a case or housing of the computer system 30 has been opened. In particular, a built-in circuit may detect whether or not the case of the computer system 30 has been opened and, if so, it may then be assumed during boot up that the memory devices 52 have been changed.

A memory module interlock circuit may be provided which, in a similar fashion to the case intrusion sensor, detects when a memory module or device has been removed form its associated socket.

Data associated with the particular type of reset which the computer system 30 has undergone may be used to define the reference data. For example, the chipset 38 may be operable to differentiate between a warm reset and cold (power-on) reset. A power-on reset typically only occurs after the computer system 30 has been switched off and subsequently switched on again. The memory initialization methods 70,90 and 100 may be configured in such a fashion so as to assume that the memory devices 52 could only have changed after the computer system 30 has been switched off completely and thereafter switched on again.

In the embodiments described above, a method of initializing at least one hardware component in the form of the memory modules 52 has been described. However, it is important to appreciate that any hardware component of the computer system 30 that requires initializing subsequent to the pre-memory platform initialization step 74 may be initialized using the method. Broadly, the invention can be applied to any electronic components, devices or modules in a computer system that are accessed and initialized based on configuration data associated with the particular hardware component. For example, the AGP 48, the USB ports 58, the hard drive interface 60, the optical drive interface 62, and the printer interface 64, as shown in FIG. 1, may also only be comprehensively initialized when there has been a change in their configuration.

In particular, any hardware component or device requiring device parameters (e.g., one or more registers in one or more different devices) which must be initialized to achieve a desired behavior, and which can be initialized using reference identification data can be initialized using the method according to the invention. In these circumstances, sets of device parameters (e.g., one or more registers in one or more different devices), which must be read in order to be able to calculate the correct values or determine the appropriate output parameters, can be read. The devices are typically initialized by system firmware.

Thus, a method and system for initializing at least one hardware component of a computer system have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   storing reference data of at least one hardware device;
   retrieving current data from the hardware device;
   comparing the current data and the reference data to determine if the hardware device has changed subsequent to storing the reference data, wherein the reference data includes reference initialization data and reference identification data; and subsequent to the retrieving, initializing the hardware device using the reference data if the hardware device has not changed.

2. The method of claim 1, in which the reference data includes data required for operation of the hardware device within the system.

3. The method of claim 1, further including replacing the reference data with the current data and initializing the hardware device using the current data if the hardware device has changed without re-booting a computer system including the hardware device.

4. The method of claim 3, wherein comparing the current data and the reference data further comprises comparing the current data with the reference identification data to determine if the hardware device has changed.

5. The method of claim 4, in which the reference identification data includes one of a serial number, configuration data, a case intrusion sensor, interlock circuit data, and reset data, of the device.

6. The method of claim 4, in which the reference identification data is derived from the reference initialization data.

7. The method of claim 4, in which the hardware device is a memory device and the reference initialization data includes Serial Presence Detect (SPD) data of the memory device.

8. The method of claim 1, in which initializing of the hardware device takes place when the computer system is booted.

9. The method of claim 4, in which the reference identification data is obtained from a hardware device in the form of a storage device including one of a hard drive, tape drive, floppy drive, and CDROM drive.

10. The method of claim 4, in which the reference identification data is obtained from a hardware device including one of a pointing device, a keyboard, and a processor.

11. A method comprising:
performing, upon resetting of a computer system, a platform initialization, including initializing a processor and an associated chipset;
retrieving current data from a memory device of the computer system to identify the memory device;
comparing the current data and reference data to determine if the memory device has changed subsequent to storage of the reference data, wherein the reference data includes reference initialization data and reference identification data; and
initializing the memory device using the reference data if the memory device has not changed and, if the memory device has changed, retrieving current data from the memory device and initializing the memory device using the current data and storing the current data as reference data without re-booting the computer system.

12. The method of claim 11, wherein the reference identification data identifies the memory device, and the reference initialization data initializes the memory device.

13. The method of claim 12, in which the reference identification data includes one of a serial number, configuration data, interlock circuit data, and reset data, of the memory device.

14. The method of claim 12, in which the reference identification data is derived from the reference initialization data.

15. A computer system comprising:
at least one hardware device requiring initialization;
memory to store reference data of the hardware device, wherein the reference data includes reference initialization data and reference identification data; and
a processor to:
retrieve current data from the hardware device to identify the hardware device;
compare the current data and the reference data to determine if the hardware device has changed subsequent to storage of the reference data; and
subsequent to the processor retrieving the current data, to initialize the hardware device using the reference data if the hardware device has not changed.

16. The system of claim 15, in which the reference data includes data required for operation of the hardware device within the computer system.

17. The system of claim 15, in which the processor replaces the reference data in the memory with current data and initializes the hardware device using the reference data when the hardware device has changed without re-booting the computer system.

18. The system of claim 15, wherein to compare the current data and the reference data further comprises comparing the reference identification data with the current data to determine if the hardware device has changed.

19. The system of claim 18, in which the reference identification data includes one of a serial number, configuration data, a case intrusion sensor, interlock circuit data, and reset data, of the device.

20. The system of claim 18, in which the reference identification data is derived from the reference initialization data.

21. The system of claim 18, in which the hardware device is a memory device and the reference initialization data includes Serial Presence Detect (SPD) data of the memory device.

22. The system of claim 15, in which initializing of the hardware device takes place when the computer system is booted.

23. The system of claim 15, in which the hardware device is an RDRAM memory.

24. The system of claim 15, further comprising:
a peripheral interconnect interface (PCI) bus coupled to the processor.

25. A computer program product including a medium readable by a computer, the medium carrying instructions which, when executed cause the computer to:
store reference data of a hardware device to be initialized;
retrieve current data from the hardware device;
compare the current data and the reference data to determine if the hardware device has changed subsequent to storage of the reference data, wherein the reference data includes reference initialization data and reference identification data; and
subsequent to the computer retrieving the current data, to initialize the hardware device using the reference data if the hardware device has not changed.

26. The computer program product of claim 25, in which the reference data includes data required for operation of the hardware device within a computer system.

27. The computer program product of claim 25, in which the processor replaces the reference data with the current data and initializes the hardware device using the current data if the hardware device has changed without re-booting the computer.

28. The computer program product of claim 25, wherein to compare the current data and the reference data further comprises comparing the current data with the reference identification data to determine if the hardware device has changed.

29. The computer program product of claim 28, in which the reference identification data includes one of a serial number, configuration data, a case intrusion sensor, interlock circuit data, and reset data, of the device.

30. The computer program product of claim 28, in which the reference identification data is derived from the initialization data.

31. The computer program product of claim 28, in which the hardware device is a memory device and the reference initialization data includes Serial Presence Detect (SPD) data of the memory device.

32. The computer program product of claim 25, in which the processor initializes the hardware device when the computer system is booted.

* * * * *